US012587362B1

(12) United States Patent
Vijayvergia et al.

(10) Patent No.: US 12,587,362 B1
(45) Date of Patent: \*Mar. 24, 2026

(54) MANAGING BLOCKCHAIN ACCESS

(71) Applicant: United Services Automobile Association (USAA), San Antonio, TX (US)

(72) Inventors: Gunjan Vijayvergia, San Antonio, TX (US); Steven J. Schroeder, Oak Point, TX (US)

(73) Assignee: United Services Automobile Association (USAA), San Antonio, TX (US)

( \* ) Notice: Subject to any disclaimer, the term of this patent is extended or adjusted under 35 U.S.C. 154(b) by 152 days.

This patent is subject to a terminal disclaimer.

(21) Appl. No.: 18/089,233

(22) Filed: Dec. 27, 2022

Related U.S. Application Data

(63) Continuation of application No. 17/088,389, filed on Nov. 3, 2020, now Pat. No. 11,539,507, which is a
(Continued)

(51) Int. Cl.
*H04L 9/06* (2006.01)
*H04L 9/14* (2006.01)
(Continued)

(52) U.S. Cl.
CPC .............. *H04L 9/0637* (2013.01); *H04L 9/14* (2013.01); *H04L 9/30* (2013.01); *H04L 9/3242* (2013.01)

(58) Field of Classification Search
CPC . H04L 9/0637; H04L 9/14; H04L 9/30; H04L 9/3242
(Continued)

(56) References Cited

U.S. PATENT DOCUMENTS 4,833,594 A \* 5/1989 Familetti ............. G06F 9/44505
713/1
5,594,639 A 1/1997 Atsumi
(Continued)

FOREIGN PATENT DOCUMENTS

AU 2016101183 A4 9/2016
CA 3012823 A1 8/2017
(Continued)

OTHER PUBLICATIONS

Bonneau, Joseph, Andrew Miller, Jeremy Clark, Arvind Narayanan, Joshua A. Kroll, and Edward W. Felten. "Sok: Research perspectives and challenges for bitcoin and cryptocurrencies." In 2015 IEEE symposium on security and privacy, pp. 104-121. IEEE 2015. (Year: 2015).\*
(Continued)

*Primary Examiner* — Luu T Pham
*Assistant Examiner* — Walter J Malinowski
(74) *Attorney, Agent, or Firm* — Fletcher Yoder, P.C.

(57) ABSTRACT

Techniques are described for managing access to data stored in a blockchain, and for managing the communication of blockchain data to other entities. A private key may be generated and issued to an external entity to enable the external entity to access an internal (e.g., private blockchain). The external entity may be an external (e.g., public) blockchain, device, process, or user that is outside an internal network. The key may be associated with metadata that includes constraints, conditions, or rules governing access to the blockchain. An authorized entity may employ the key to request access to the blockchain via access management module(s), and the access management module(s) may employ the metadata to determine whether to approve the request. The access management module(s) may
(Continued)

also employ rules governing outbound communication of data from internal blockchain(s) to external entities.

14 Claims, 7 Drawing Sheets

Related U.S. Application Data continuation of application No. 15/366,098, filed on Dec. 1, 2016, now Pat. No. 10,833,843.

(60) Provisional application No. 62/262,771, filed on Dec. 3, 2015.

(51) Int. Cl.
  *H04L 9/30* (2006.01)
  *H04L 9/32* (2006.01)

(58) Field of Classification Search
  USPC ........................................................ 713/168
  See application file for complete search history.

(56) References Cited

U.S. PATENT DOCUMENTS

| | | | |
|---|---|---|---|
| 5,978,779 A | 11/1999 | Stein et al. | |
| 6,061,449 A * | 5/2000 | Candelore | G06F 21/14 |
| | | | 713/168 |
| 6,157,871 A | 12/2000 | Terranova | |
| 7,110,984 B1 | 9/2006 | Spagna et al. | |
| 8,826,041 B1 | 9/2014 | Contreras et al. | |
| 9,298,806 B1 * | 3/2016 | Vessenes | G06F 16/244 |
| 9,324,074 B2 | 4/2016 | Lotter et al. | |
| 9,544,284 B1 | 1/2017 | Dooley et al. | |
| 9,722,974 B1 * | 8/2017 | Fuller | H04L 9/0836 |
| 9,779,269 B1 | 10/2017 | Perlman | |
| 9,855,785 B1 | 1/2018 | Nagelberg | |
| 9,961,030 B2 | 5/2018 | Murphy et al. | |
| 9,998,434 B2 | 6/2018 | Verzun et al. | |
| 10,140,658 B1 * | 11/2018 | Bagherzadeh | G06Q 20/381 |
| 10,467,422 B1 | 11/2019 | Roth et al. | |
| 10,586,062 B1 | 3/2020 | Rangan et al. | |
| 10,805,393 B2 * | 10/2020 | Grefen | H04L 67/1097 |
| 2003/0055861 A1 | 3/2003 | Lai et al. | |
| 2003/0184339 A1 | 10/2003 | Ikeda et al. | |
| 2004/0172216 A1 | 9/2004 | Davenport et al. | |
| 2004/0177216 A1 * | 9/2004 | Asari | G06F 12/0246 |
| | | | 711/E12.008 |
| 2006/0059038 A1 | 3/2006 | Luchi et al. | |
| 2006/0080529 A1 | 4/2006 | Yoon et al. | |
| 2006/0195485 A1 | 8/2006 | Bird et al. | |
| 2006/0245588 A1 | 11/2006 | Hatakeyama | |
| 2006/0272026 A1 | 11/2006 | Niwano et al. | |
| 2006/0294355 A1 | 12/2006 | Zimmer et al. | |
| 2007/0113054 A1 | 5/2007 | Guibert et al. | |
| 2007/0282726 A1 | 12/2007 | Koester et al. | |
| 2008/0077806 A1 | 3/2008 | Cui et al. | |
| 2008/0178001 A1 | 7/2008 | Kim et al. | |
| 2009/0013385 A1 | 1/2009 | Olczak | |
| 2009/0092252 A1 | 4/2009 | Noll et al. | |
| 2009/0319527 A1 | 12/2009 | King et al. | |
| 2010/0014666 A1 | 1/2010 | Park et al. | |
| 2010/0090720 A1 | 4/2010 | Deeley et al. | |
| 2010/0115186 A1 * | 5/2010 | Chang | G06F 12/0246 |
| | | | 711/E12.001 |
| 2011/0219184 A1 | 9/2011 | Jaquette et al. | |
| 2011/0261964 A1 | 10/2011 | Kahler et al. | |
| 2012/0159195 A1 * | 6/2012 | von Behren | G06F 21/62 |
| | | | 713/193 |
| 2012/0163396 A1 | 6/2012 | Cheng et al. | |
| 2013/0080181 A1 | 3/2013 | Depetro | |
| 2013/0136264 A1 | 5/2013 | Kim et al. | |
| 2014/0089282 A1 | 3/2014 | Sampathkumar | |
| 2014/0114816 A1 | 4/2014 | Greef et al. | |
| 2014/0279384 A1 | 9/2014 | Loevenich | |
| 2014/0279526 A1 | 9/2014 | Jackson | |
| 2015/0067792 A1 | 3/2015 | Benoit et al. | |
| 2015/0074408 A1 * | 3/2015 | Oberheide | H04L 9/083 |
| | | | 713/171 |
| 2015/0087427 A1 | 3/2015 | Wane | |
| 2015/0124833 A1 | 5/2015 | Ma et al. | |
| 2015/0127832 A1 | 5/2015 | Kirner et al. | |
| 2015/0133256 A1 | 5/2015 | Frank et al. | |
| 2015/0163206 A1 | 6/2015 | McCarthy et al. | |
| 2015/0170112 A1 | 6/2015 | Decastro | |
| 2015/0206106 A1 * | 7/2015 | Yago | G06Q 20/0655 |
| | | | 705/68 |
| 2015/0234829 A1 | 8/2015 | Yoshitake et al. | |
| 2015/0244690 A1 * | 8/2015 | Mossbarger | H04L 9/50 |
| | | | 713/171 |
| 2015/0254640 A1 * | 9/2015 | Cassano | G06Q 20/36 |
| | | | 705/71 |
| 2015/0288694 A1 * | 10/2015 | Liebl, III | H04L 9/3247 |
| | | | 713/182 |
| 2015/0302400 A1 * | 10/2015 | Metral | G06Q 40/12 |
| | | | 705/75 |
| 2015/0332256 A1 | 11/2015 | Minor | |
| 2015/0332395 A1 | 11/2015 | Walker et al. | |
| 2015/0363770 A1 | 12/2015 | Ronca et al. | |
| 2015/0363777 A1 | 12/2015 | Ronca et al. | |
| 2015/0363778 A1 | 12/2015 | Ronca et al. | |
| 2015/0363782 A1 | 12/2015 | Ronca et al. | |
| 2015/0363783 A1 | 12/2015 | Ronca et al. | |
| 2015/0370725 A1 | 12/2015 | McMullen et al. | |
| 2015/0371224 A1 | 12/2015 | Lingappa | |
| 2015/0379510 A1 | 12/2015 | Smith | |
| 2016/0012465 A1 | 1/2016 | Sharp | |
| 2016/0027229 A1 | 1/2016 | Spanos et al. | |
| 2016/0028552 A1 | 1/2016 | Spanos et al. | |
| 2016/0092988 A1 | 3/2016 | Letourneau et al. | |
| 2016/0098723 A1 | 4/2016 | Feeney | |
| 2016/0134593 A1 | 5/2016 | Gvili | |
| 2016/0142387 A1 | 5/2016 | Lockhart et al. | |
| 2016/0203477 A1 | 7/2016 | Yang et al. | |
| 2016/0224977 A1 | 8/2016 | Sabba et al. | |
| 2016/0234026 A1 * | 8/2016 | Wilkins | G06F 21/64 |
| 2016/0253663 A1 | 9/2016 | Clark et al. | |
| 2016/0260169 A1 | 9/2016 | Arnold et al. | |
| 2016/0267472 A1 | 9/2016 | Lingham et al. | |
| 2016/0284033 A1 * | 9/2016 | Winand | G06Q 20/127 |
| 2016/0292672 A1 | 10/2016 | Fay et al. | |
| 2016/0294735 A1 | 10/2016 | Panchagnula et al. | |
| 2016/0321751 A1 | 11/2016 | Creighton, IV et al. | |
| 2016/0321752 A1 | 11/2016 | Tabacco et al. | |
| 2016/0328713 A1 | 11/2016 | Ebrahimi | |
| 2016/0330034 A1 * | 11/2016 | Back | G06Q 20/065 |
| 2016/0342977 A1 * | 11/2016 | Lam | G06Q 20/0658 |
| 2016/0342978 A1 | 11/2016 | Davis et al. | |
| 2016/0342989 A1 | 11/2016 | Davis | |
| 2016/0342994 A1 | 11/2016 | Davis | |
| 2016/0358165 A1 | 12/2016 | Maxwell | |
| 2017/0017955 A1 | 1/2017 | Stern et al. | |
| 2017/0039330 A1 | 2/2017 | Tanner et al. | |
| 2017/0041296 A1 | 2/2017 | Ford et al. | |
| 2017/0046526 A1 | 2/2017 | Chan et al. | |
| 2017/0046651 A1 | 2/2017 | Lin et al. | |
| 2017/0046664 A1 | 2/2017 | Haldenby et al. | |
| 2017/0046693 A1 | 2/2017 | Haldenby et al. | |
| 2017/0046698 A1 | 2/2017 | Haldenby et al. | |
| 2017/0046792 A1 * | 2/2017 | Haldenby | G06Q 10/0631 |
| 2017/0053249 A1 | 2/2017 | Tunnell et al. | |
| 2017/0054611 A1 * | 2/2017 | Tiell | G06Q 30/0631 |
| 2017/0061138 A1 | 3/2017 | Lambert | |
| 2017/0076280 A1 | 3/2017 | Castinado et al. | |
| 2017/0076286 A1 | 3/2017 | Castinado et al. | |
| 2017/0078299 A1 | 3/2017 | Castinado et al. | |
| 2017/0091397 A1 | 3/2017 | Shah | |
| 2017/0093585 A1 * | 3/2017 | Lee | H04L 9/14 |
| 2017/0103167 A1 | 4/2017 | Shah | |
| 2017/0103391 A1 | 4/2017 | Wilson, Jr. et al. | |
| 2017/0109748 A1 | 4/2017 | Kote | |
| 2017/0116693 A1 * | 4/2017 | Rae | G06Q 50/184 |
| 2017/0124556 A1 * | 5/2017 | Seger, II | H04L 67/1095 |

(56) References Cited

U.S. PATENT DOCUMENTS

| | | | |
|---|---|---|---|
| 2017/0132625 A1 | 5/2017 | Kennedy | |
| 2017/0132626 A1 | 5/2017 | Kennedy | |
| 2017/0132630 A1* | 5/2017 | Castinado | G06F 16/2255 |
| 2017/0134280 A1 | 5/2017 | Davis | |
| 2017/0140145 A1 | 5/2017 | Shah | |
| 2017/0140375 A1 | 5/2017 | Kustel | |
| 2017/0140408 A1 | 5/2017 | Wuehler | |
| 2017/0141926 A1 | 5/2017 | Xu et al. | |
| 2017/0147808 A1 | 5/2017 | Kravitz | |
| 2017/0154331 A1* | 6/2017 | Voorhees | H04L 9/3255 |
| 2017/0163733 A1* | 6/2017 | Grefen | H04L 9/3236 |
| 2017/0169800 A1 | 6/2017 | Greco et al. | |
| 2017/0178237 A1 | 6/2017 | Wong | |
| 2017/0228704 A1 | 8/2017 | Zhou et al. | |
| 2017/0230353 A1 | 8/2017 | Kurian et al. | |
| 2017/0230375 A1 | 8/2017 | Kurian | |
| 2017/0236121 A1 | 8/2017 | Lyons et al. | |
| 2017/0243025 A1 | 8/2017 | Kurian et al. | |
| 2017/0243177 A1 | 8/2017 | Johnsrud et al. | |
| 2017/0243208 A1 | 8/2017 | Kurian et al. | |
| 2017/0243209 A1 | 8/2017 | Johnsrud et al. | |
| 2017/0243212 A1 | 8/2017 | Castinado et al. | |
| 2017/0243286 A1 | 8/2017 | Castinado et al. | |
| 2017/0244707 A1 | 8/2017 | Johnsrud et al. | |
| 2017/0244757 A1 | 8/2017 | Castinado et al. | |
| 2017/0270527 A1 | 9/2017 | Rampton | |
| 2017/0286951 A1 | 10/2017 | Ignatchenko et al. | |
| 2017/0287068 A1 | 10/2017 | Nugent | |
| 2018/0157853 A1 | 6/2018 | Kumar et al. | |
| 2018/0204191 A1* | 7/2018 | Wilson | H04L 9/30 |
| 2018/0227293 A1* | 8/2018 | Uhr | G06Q 20/40 |
| 2018/0227793 A1 | 8/2018 | Kim et al. | |
| 2018/0253702 A1 | 9/2018 | Dowding | |
| 2018/0285879 A1 | 10/2018 | Gadnis et al. | |
| 2018/0293573 A1* | 10/2018 | Ortiz | G06Q 20/102 |
| 2018/0294977 A1 | 10/2018 | Uhr et al. | |
| 2018/0341937 A1 | 11/2018 | Kim et al. | |
| 2018/0357391 A1 | 12/2018 | Dekker | |
| 2020/0364588 A1* | 11/2020 | Knox | G06V 40/20 |

FOREIGN PATENT DOCUMENTS

| | | | | | |
|---|---|---|---|---|---|
| CN | 103580915 A | | 2/2014 | | |
| CN | 105681301 A | | 6/2016 | | |
| CN | 106204287 A | | 12/2016 | | |
| CN | 106408299 A | | 2/2017 | | |
| CN | 106506493 A | | 3/2017 | | |
| CN | 106600401 A | | 4/2017 | | |
| CN | 106611372 A | | 5/2017 | | |
| CN | 106682528 A | | 5/2017 | | |
| EP | 2175374 A1 | | 4/2010 | | |
| GB | 2540977 A | | 2/2017 | | |
| JP | 63163635 A | | 7/1988 | | |
| JP | 0635766 A | | 2/1994 | | |
| JP | 2004265162 A | * | 9/2004 | | G06F 12/0246 |
| KR | 20070092416 A | * | 9/2007 | | |
| KR | 20090115089 A | * | 11/2009 | | |
| KR | 101661930 B1 | | 10/2016 | | |
| KR | 20160150278 A | | 12/2016 | | |
| KR | 101701131 B1 | | 2/2017 | | |
| KR | 20170040079 A | | 4/2017 | | |
| KR | 101762245 B1 | | 7/2017 | | |
| WO | 2016029119 A1 | | 2/2016 | | |
| WO | 2016175914 A2 | | 11/2016 | | |
| WO | 2017022917 A1 | | 2/2017 | | |
| WO | 2017027900 A1 | | 2/2017 | | |
| WO | 2017066002 A1 | | 4/2017 | | |
| WO | 2017091530 A1 | | 6/2017 | | |
| WO | 2017136956 A1 | | 8/2017 | | |
| WO | 2017139688 A1 | | 8/2017 | | |
| WO | 2017146333 A1 | | 8/2017 | | |

OTHER PUBLICATIONS

Westland, J. Christopher, and Theordore H. Clark. "Secure Digital Payments." (1999): 465-528. (Year: 1999).*

Seitz, Ludwig, J-M. Pierson, and Lionel Brunie. "Key management for encrypted data storage in distributed systems." In Second IEEE International Security in Storage Workshop, pp. 20-20. IEEE, 2003. (Year: 2003).*

Bhatti, Rafae, Basit Shafiq, Mohamed Shehab, and Arif Ghafoor. "Distributed access management in multimedia IDCs." Computer 38, No. 9 (2005): 60-69. (Year: 2005).*

Back "Enabling blockchain innovations with pegged sidechains." URL: http://www. opensciencereview. com/ papers/123/ enablingblockchain-innovations-with-pegged-sidechains (2014): 72. (Year: 2014).

Faisal, Tooba, Nicolas Courtois, and Antoaneta Serguieva. "The evolution of embedding metadata in blockchain transactions." In 2018 International Joint Conference on Neural Networks (IJCNN), pp. 1-9. IEEE, 2018. (Year: 2018).

Crary, Karl, and Michael J. Sullivan. "Peer-to-peer affine commitment using bitcoin." In Proceedings of the 36th ACM SIGPLAN Conference on Programming Language Design and Implementation, pp. 479-488. 2015. (Year: 2015).

Nakamoto, Satoshi. Bitcoin: A peer-to-peer electronic cash system. Manubot, 2019. (Year: 2019).

Evans, "8itcoin 2.0: Sidechains And Ethereum and Zerocash, Oh My!", https://techcrunch.com/2014/10/25/bitcoin-2-0-sidechains-and-zerocash-and-ethereum-oh-my/, Oct. 25, 2014, 12 pages (Year: 2014).

Zyskind, Guy, and Oz Nathan. "Decentralizing privacy: Using blockchain to protect personal data." In Security and Privacy Workshops (SPW), 2015 IEEE, pp. 180-184. IEEE, 2015. (Year: 2015).

Niu, "Dsfs: Decentralized security for large parallel file systems." In Grid Computing (GRID), 2010 11th IEEE/ACM International Conference on, pp. 209-216. IEEE, 2010. (Year: 2010).

Alqassem, "Towards reference architecture for cryptocurrencies: Bitcoin architectural analysis." In Internet of Things (iThings), 2014 IEEE International Conference on, and Green Computing and Communications (GreenCom), IEEE and Cyber, Physical and Social Computing (CPSCom), IEEE, pp. 4 (Year: 2014).

Van der Pasch, "An exploration and characterization of public blockchain generations", Eindhoven University of Eindhoven University of Technology, Aug. 2011, 97 pages. (Year: 2011).

Rizzo, "Blockstream to Launch First Sidechain for Bitcoin", https://www.coindesk.com/blockstream-commercial-sidechain-bitcoin-exchanges, Oct. 19, 2015, 7 pages. (Year: 2015).

Andresen, "Big-0 Scaling", https://www.reddit.com/r/Bitcoin/comments/311j0j/bigo_scaling_gavin_andresen, Sep. 19, 2015, 37 pages. (Year: 2015).

Lamport, Leslie, Robert Shostak, and Marshall Pease. "The Byzantine generals problem." ACM Transactions on Programming Languages and Systems (TOPLAS) 4, No. 3 (1982): 382-401. (Year: 1982).

BitFury Group in collaboration with Jeff Garzik, Public versus Private Blockchains, https://bitfury.com/content/downloads/public-vs-private-pt1-1.pdf, Oct. 20, 2015, 20 pages. (Year: 2015).

Cryptocurrencies, www.primechaintech.com/docs/blockchain/Cryptocurrencies.pdf, Aug. 2, 2006, 142 pages. (Year: 2006).

Back, "Enabling blockchain innovations with pegged sidechains." URL:http://www.opensciencereview.com/papers/123/enablingblockchain-innovations-with-pegged-sidechains (2014). (Year: 2014).

Brown, "Thoughts on the future of Finance" including "A simple explanation of Bitcoin "sidechains"", Oct. 26, 2014, 29pages. (Year: 2014).

Paul, Greig, and James Irvine. "A protocol for storage limitations and upgrades in decentralised networks." (Year: 2014).

* cited by examiner

Detect an attempt to communicate data from an internal blockchain to external entities
602

Access rule(s) governing outbound data transfer(s)
604

Attempt complies with rule(s)?
606 no yes

Third party permission required?
608 no yes

Enable outbound traffic
612 yes

Third party permission received?
610 no

Do not enable outbound traffic
614

MANAGING BLOCKCHAIN ACCESS

CROSS-REFERENCE TO RELATED APPLICATION

This application is a continuation of U.S. patent application Ser. No. 17/088,389, now U.S. Pat. No. 11,539,507, filed Nov. 3, 2020, which is a continuation of U.S. patent application Ser. No. 15/366,098, entitled "Managing Blockchain Access," filed Dec. 1, 2016, now U.S. Pat. No. 10,833,843, which claims priority to and the benefit of U.S. Provisional Patent Application Ser. No. 62/262,771, which was filed on Dec. 3, 2015, each of which is incorporated herein by reference in their entireties

BACKGROUND

Financial service providers such as banks, insurance companies, investment management firms, or other types of businesses generate and store information regarding customer accounts, insurance policies, or investment portfolios. A business may implement systems or procedures to safeguard such information and prevent access by unauthorized individuals or processes. A business may employ blockchains to store data. Because typical blockchains provide a publicly accessible record of transactions regarding stored data, the use of blockchains for data storage may conflict with a business's need to control access to confidential data.

SUMMARY

Implementations of the present disclosure are generally directed to managing access to data stored in a blockchain. More particularly, implementations of the present disclosure are directed to managing access by an external (e.g., public) blockchain to data stored in an internal (e.g., private) blockchain through use of a private key, and through use of metadata that indicates constraints, conditions, or rules governing the use of the private key to access the internal blockchain. Implementations of the present disclosure are also directed to managing the communication of internal blockchain data to external entities.

In general, innovative aspects of the subject matter described in this specification can be embodied in methods that includes actions of: receiving a request for a first blockchain to access a portion of data stored in a second blockchain, the request including a key; accessing metadata associated with the key, the metadata including one or more restrictions for accessing data stored in the second blockchain; and based on determining that the request complies with the one or more restrictions, providing the first blockchain access to the portion of data stored in the second blockchain.

Implementations can include one or more of the following features: the metadata describes one or more portions of data in the second blockchain that are to be accessible using the key; determining that the request complies with the one or more restrictions includes determining that the requested portion of data is included in the one or more portions of data described in the metadata; the metadata describes a time constraint for accessing the second blockchain using the key; determining that the request complies with the one or more restrictions includes determining that the request is received within the time constraint; the metadata identifies a computing system that is authorized to access the second blockchain using the key; determining that the request complies with the one or more restrictions includes determining that the request is received from the computing system; the metadata identifies the computing system using one or more of: an internet protocol (IP) address of the computing system; a media access control (MAC) address of the computing system; or an identifier associated with an operator of the computing system; the metadata identifies at least one third party associated with the second blockchain; determining that the request complies with the one or more restrictions includes determining that the at least one third party has consented to the first blockchain accessing the second blockchain; detecting an attempt to communicate data stored in the second blockchain to an external blockchain; accessing one or more rules associated with the second blockchain, the one or more rules governing external communication of data from the second blockchain; based on determining that the attempt complies with the one or more rules, allowing communication of data in the second blockchain to the external blockchain; the one or more rules indicate one or more internal users authorized to externally communicate data stored in the second blockchain; determining that the attempt complies with the one or more rules includes determining that the attempt is associated with at least one of the one or more internal users; the one or more rules indicate one or more external entities authorized to receive data stored in the second blockchain; determining that the attempt complies with the one or more rules includes determining that the one or more external entities include the external blockchain; the one or more rules identify at least one third party associated with the second blockchain; or determining that the attempt complies with the one or more rules includes determining that the at least one third party has consented to the external communication of data from the second blockchain.

Other implementations of any of the above aspects include corresponding systems, apparatus, and computer programs that are configured to perform the actions of the methods, encoded on computer storage devices.

Implementations of the present disclosure provide one or more of the following technical advantages and/or improvements compared to traditional systems. Implementations provide one or more access control modules that control and mediate the communication of data between different blockchains, such as between an internal, private blockchain and an external, public blockchain, or between two private blockchains associated with different entities. Implementations enable private, e.g., company-based, blockchains to communicate with other blockchains (e.g., the Bitcoin™ blockchain or other public or private blockchains) over a network, while reducing or eliminating the risk of spam, data manipulation, data snooping, or compromised data permission restrictions. At least some blockchain implementations are characterized by transparency, such that any entity may be permitted to view data stored on a blockchain. Given such transparency, currently used blockchain implementations may be unable to restrict blockchain access to authorized entities. Accordingly, an organization wishing to use current blockchain solutions for data storage may not be able to fully leverage the advantages of blockchains without publicly exposing private, confidential, and/or sensitive data. The implementations described herein provide an access control mechanism for controlling access to data stored on a private blockchain, enabling use of blockchains while avoiding wide public exposure of the data stored on blockchains.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
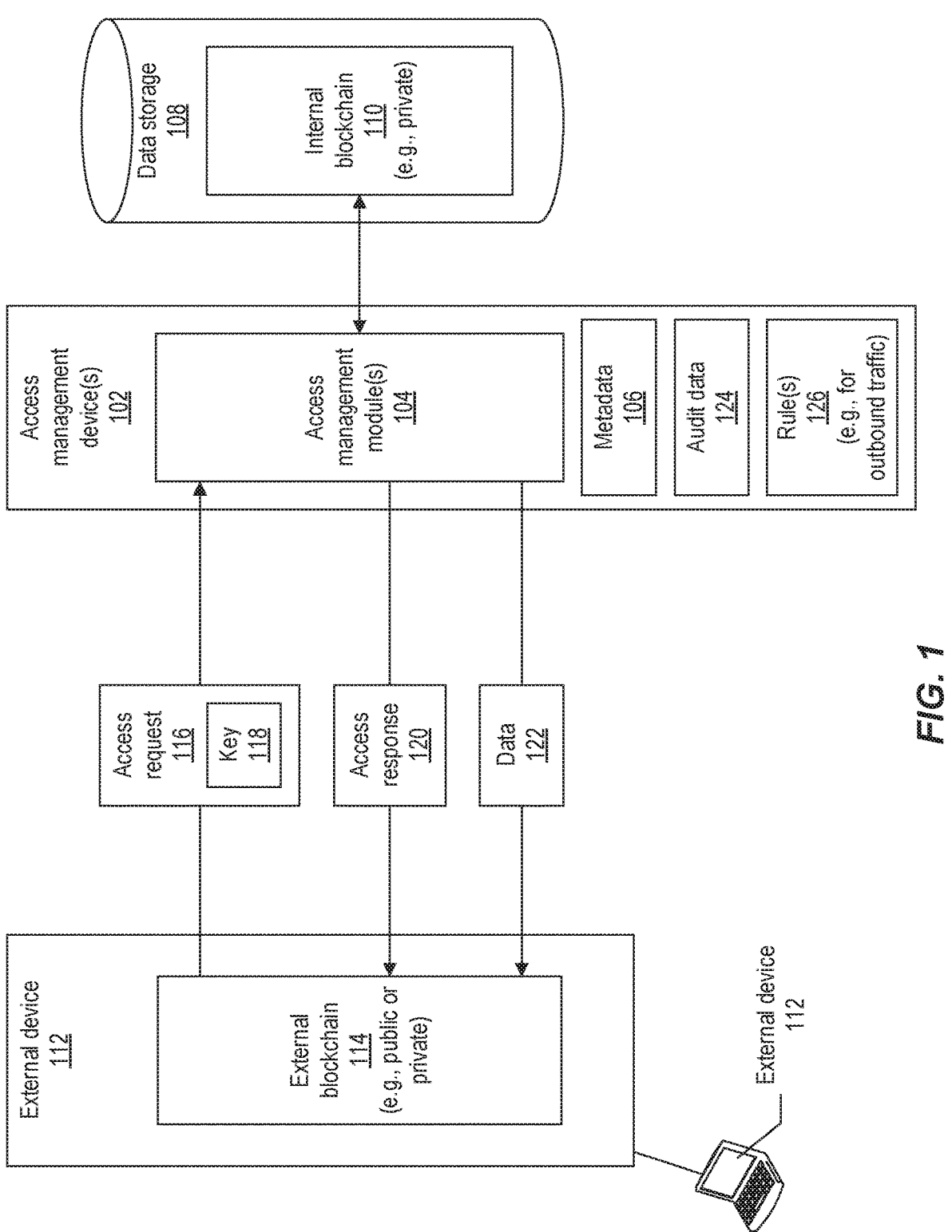
FIG. 1 depicts an example system for managing access to data stored in a blockchain, according to implementations of the present disclosure.

Implementations of the present disclosure are directed to systems, devices, methods, and computer-readable media for managing access to data stored in a blockchain. In some implementations, access management module(s) control incoming requests to access private blockchains from public blockchains, and detect attempted intrusions such as data snooping, blockchain spam, and smart contract manipulation. The access management module(s) also monitor information communicated out from private blockchains, to ensure that private, sensitive, or confidential information is not provided to other blockchains unless authorized. The access management module(s) may be described as a firewall that mediates and manages data transfers between different blockchains. The access management module(s) may employ one or more keys to determine access rights and determine the particular private information to be accessible by external (e.g., public) blockchains. The access management module(s) may also control communications between two private blockchains with differing access permissions, or between consortium blockchains managed by multiple parties. In some examples, the access management module(s) are implemented as a smart contract or other software that "directs traffic" between internal and external entities.

In some implementations, the access management module(s) are software module(s) that facilitate the communication of data between a private blockchain and a public blockchain. The access management module(s) may be configured to act as an access control and intrusion prevention system, allowing for controlled interactions with external or internal blockchains and networks from either public or private entities. The intrusion prevention aspect of the access management module(s) protects against data snooping, blockchain spam, and smart contract manipulation. The access management module(s) enable internal (private) blockchains to communicate and transfer data with external (public) or internal (private) blockchains. Examples of data to be transferred include commands, smart contracts, digital currency, and any other type of data. Making use of smart contracts, the access management module(s) may be smart contract(s), upon which a blockchain and smart contract infrastructure sits. This allows more fine-grained access control, which may include ephemeral (e.g., expiring) tokens, which throttle write permissions. Tokens, such as keys, may be distributed to those needing access to a private blockchain. The tokens may be one time use tokens that, along with a secondary authentication method, provide temporary and restricted access to only the data in the private blockchain that the requesting entity needs. Implementations may include an expiring token mechanism for blockchains accessing one another while authenticating through the access management module(s). This expiring token mechanism allows for temporary, time, controlled access to the blockchain for those who need it without compromising the privacy and security of the blockchain data.

FIG. 1 depicts an example system for managing access to data stored in a blockchain, according to implementations of the present disclosure. As shown in the example of FIG. 1, the system may include one or more access management devices 102. The access management device(s) 102 may include any type of computing device, such as server computers, distributed computing devices (e.g., cloud servers), network management appliances (e.g., hubs, routers, gateway devices, etc.), and so forth. The access management device(s) 102 may execute one or more access management modules 104. In some implementations, the access management module(s) 104 may be component(s) of a corporate network, intranet, or other internal network that is secured against unauthorized access by users, processes, or devices that are external to the network. The access management module(s) 104 may control whether external users, processes, devices, blockchains, or other external entities are permitted to access data stored on one or more internal blockchains 110. In some examples, the internal blockchain(s) 110 are stored in data storage 108. The data storage 108 may include any number of data storage devices that include any number of databases, file systems, or other forms of data storage. The data storage 108 may store any amount of data in any format, and may include any type of data storage such as relational and/or non-relational data storage. The internal blockchain(s) 110 may be described as private blockchain(s), given that access to the internal blockchain(s) 110 may be selectively permitted to authorized entities.

An internal entity may include an internal device, internal process, internal blockchain, or internal user. As used herein, an internal device is a computing device connected to an internal network such as an intranet, private network, or sub-network that is secured against unauthorized access by users, processes, or devices that are not part of the internal network. An internal process executes on an internal device, and an internal blockchain is stored on internal storage device(s) or other internal device(s). An internal user is a user who has access to an internal device. An external entity, such as an external device, process, blockchain, or user, is an entity that may not have direct access to internal entities. An external entity may request access to data stored on an internal blockchain via the access management module(s) 104 executing as internal process(es) on the access management device(s) 102.

The access management device(s) 102 may store metadata 106. The metadata 106 may include any number of portions of metadata, and each portion of metadata 106 may be associated with a key 118 that is useable by an external entity to access data on an internal blockchain 110. The access management module(s) 104 may access the metadata 106 and apply the various constraints therein to determine whether access is to be granted to a requestor that provides a particular key 118.

Figure 2:
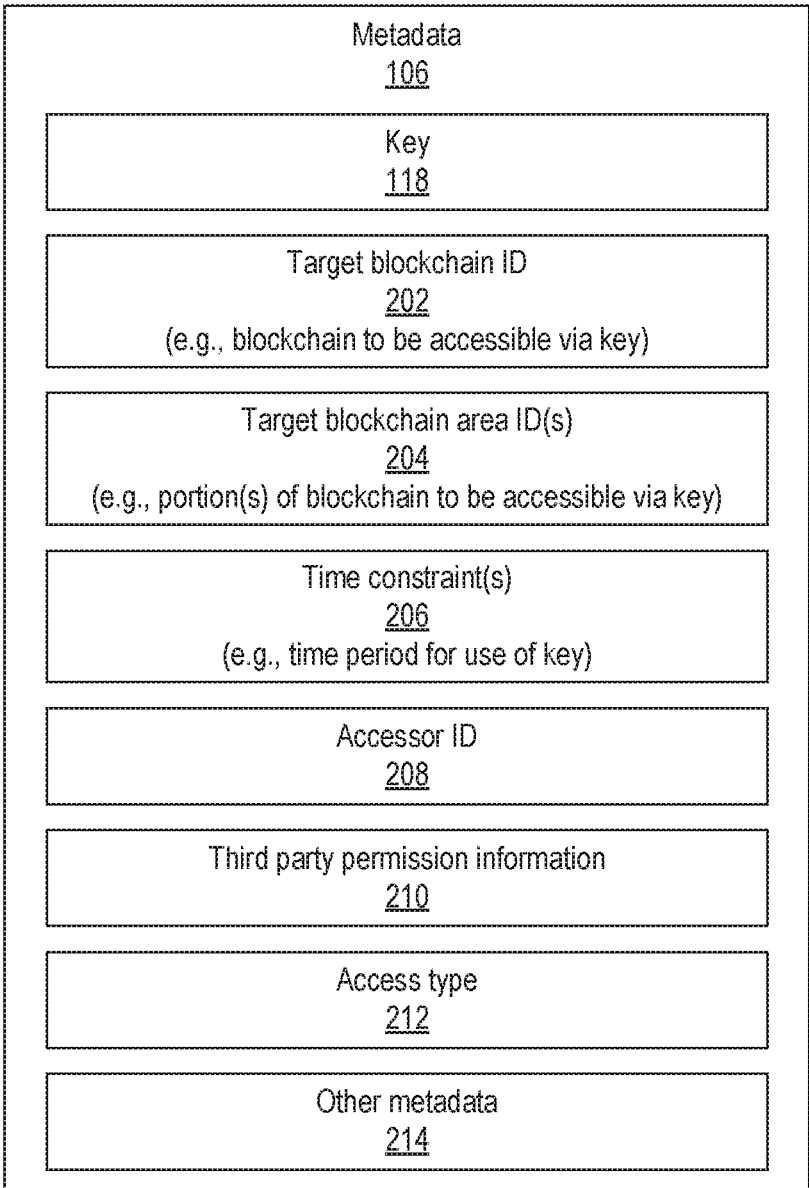
FIG. 2 depicts a schematic of example metadata that may be employed to manage access to data stored in a blockchain, according to implementations of the present disclosure.

FIG. 2 depicts a schematic of example metadata 106 that may be employed to manage access to data stored in a blockchain 110, according to implementations of the present disclosure. As shown in the example of FIG. 2, a portion of metadata 106 may include a key 118. In some examples, the metadata 106 includes a reference to, or an identifier of, the key 118 instead of or in addition to the key 118 itself. The key 118, or the key identifier, may indicate the particular key 118 that is associated with a portion of the metadata 106. The metadata 106 associated with a particular key 118 may include a target blockchain identifier (ID) 202 that (e.g., uniquely) identifies the particular blockchain 110 to be accessible using the key 118. The metadata 106 may also include target blockchain area ID(s) 204 that identify one or more portion(s) of the blockchain 110 to be accessible using the key 118. For example, a key 118 may be employable to access particular portion(s) of data on a blockchain 110 but not to access other portion(s) of data on the blockchain 110.

The metadata 106 may also include various constraints on the use of the key 118 to access data on the blockchain 110. In some examples, the metadata 106 includes one or more time constraints 206. The time constraint(s) 206 may specify one or more time periods during which the key 118 may be used. For example, the time constraint(s) 206 may be an expiration timestamp, timeout, or time-to-live (TTL), indicating a date and/or time after which the key 118 may no longer be used to access the blockchain 110. As another example, the time constraint(s) 206 may specify a number of instances in which the key 118 may be used. The time constraint(s) 206 may indicate that the key 118 is for a single use to access the blockchain 110 once, or for N uses where N may be any number. In some examples, the time constraint(s) 206 may specify both a number of uses and a time period. For example, the time constraint(s) 206 may indicate that the key 118 may be used N number of times (e.g., N>0) during a particular time period prior to a timestamp of expiration.

In some implementations, the metadata 106 includes an accessor ID 208 that identifies one or more entities to be permitted access to the blockchain 110. For example, the accessor ID 208 may include an identifier of a computing device, such as an internet protocol (IP) address, media access control (MAC) address, or other device identifier. In some examples, the accessor ID 208 may include a device identifier previously established between the external computing device and the access management module(s) 104. The accessor ID 208 may also identify particular user(s), particular process(es), or particular blockchain(s) to be permitted access to the blockchain 110. Accordingly, the accessor ID 208 may include one or more of a user name, user ID, user login, process name, process ID, a blockchain name, a blockchain identifier, and so forth. The accessor ID 208 may identify any number of entities to be provided access to the blockchain 110, such as one or more of a computing device, user, process, or external blockchain.

The metadata 106 may include third party permission information 210. The third party permission information 210 may identify one or more third parties, such as users or other entities, who are required to give their permission to enable access to the blockchain 110. For example, a blockchain 110 may be a consortium blockchain managed by multiple parties. In such examples, each of the various parties may be queried to give their permission to enable access to the blockchain 110. The third party permission information 210 may specify any number of third parties in any format, such as email addresses, network addresses, user names, personal names, business names, and so forth. The metadata 106 may specify an access type 212 to be permitted to a requestor that provides the key 118. For example, the key 118 may be authorized for read access to data on the blockchain 110, or the key 118 may be authorized for write access. The metadata 106 may also include other metadata 214 that is employed to determine access to the blockchain 110 using the key 118.

The system of FIG. 1 may include one or more external device(s) 112 that store one or more external blockchains 114. The external device(s) 112 may include any number and type of computing device(s). The external blockchain(s) 114 may include public blockchain(s) that store data generally accessible by users, devices, processes, and other blockchains. The external blockchain(s) 114 may also include private blockchain(s) for which access is restricted to authorized entities. The external blockchain 114, or a process executing on the external device 112, may generate and send an access request 116. The access request 116 may request read (e.g., read-only) access to data on the blockchain 110, such that the external blockchain 114 may read but not change the data stored on the blockchain 110. The access request 116 may request write access to the data on the blockchain 110, to modify the data.

The access request 116 may be communicated to the access management module(s) 104. The access request 116 may include a key 118 that was previously provided to the external device 112 or to a user of the external device 112. The access management module(s) 104 may analyze the key 118, and access the metadata 106 for the key 118. If the access management module(s) 104 determine that the constraints on the use of the key 118 (e.g., as specified in the metadata 106) are satisfied, the access management module(s) 104 may approve the access request 116 to access the blockchain 110. Otherwise, the access management module(s) 104 may deny the access request 116. The access management module(s) 104 may communicate an access response 120 to the external blockchain 114, indicating whether the access request 116 is approved or denied. If access is approved, data 122 from the authorized portion(s) of the blockchain 110 may be accessed by the external blockchain 114. In examples where the external blockchain 114 is permitted write access to the blockchain 110, the external blockchain 114 may send data 122 to the access management module(s) 104 to be used for updating the blockchain 110. After approving the access request 116, the access management module(s) 104 may operate as an intermediary in the various communications between the external blockchain 114 and the internal blockchain 110. The external device 112 or other external entities may communicate with the access management device(s) 102 over one or more networks (not shown), including wired or wireless network(s).

In some implementations, the access management module(s) 104 also control the communication of data from the (e.g., private) blockchain 110 to external device(s) 112, external blockchain(s) 114, or other external entities. The access management module(s) 104 employ a set of rules 126 that govern the external (e.g., outbound) communication of data from internal blockchain(s) 110. In some examples, a particular blockchain 110 or class of blockchains 110 may be associated with a set of rules 126 that govern when, to whom, and under what conditions data from the blockchain(s) 110 may be communicated externally. The control of external communication of blockchain data is described further with reference to FIG. 6.

In some implementations, the audit capabilities the blockchain(s) 110 may be employed to keep a record of the accesses to data stored in the blockchain(s) 110, and/or a record of the communication of data from the blockchain(s) 110 to external entities. In some implementations, the access management module(s) 104 may store audit data 124 describing a history (e.g., an audit trail) of the inbound accesses to data and/or the outbound data communicated via the access management module(s) 104. If they are not prevented initially, unauthorized transmissions out through the access management module(s) 104 may be identified later through an analysis of the audit data 124. The rules 126 governing external communication of data may be adjusted to prevent such unauthorized communications in the future.

In some implementations, the access management module(s) 104 may employ a blockchain access protocol (BAP) that supports various commands or requests that may be sent to the access management module(s) 104. For example, the BAP may support commands that are similar to those of HTTP, such as GET, POST, PUT, and so forth. The BAP may also support other types of commands. The access request 116 may include BAP command(s), and the access response 120 and/or communicated data 122 may be in the form of a BAP response. The BAP may also support multicast commands that enable data from a blockchain 110 to be broadcast to multiple recipients instead of a single recipient. The BAP may be an application layer protocol (e.g., operating at a same layer as HTTP) that employs a version of transmission control protocol (TCP) as an underlying protocol.

Although examples herein describe a single external entity, such as an external blockchain 114, requesting access to a single internal blockchain 110, the access management module(s) 104 may be employed in other (e.g., more complex) topologies. For example, an environment may include multiple private, public, and/or consortium blockchains and communications among the different blockchains may be controlled by different access management modules 104 or the same access control module(s) 104. The different access management modules 104 may execute on different access management device(s) 102, or on a same set of one or more access management devices 102. In some implementations, multiple access management modules 104 may function as smart contracts, and may interact with one another to reach consensus regarding the communication of blockchain data to various entities.

In some examples, consortium blockchains may be governed by proof of stake rules. For example, a consortium member may provide a stake to "buy in" to a blockchain, and that stake may be surrendered if the consortium member violates terms of use of the blockchain. In some implementations, the access management module(s) 104 may be configured to police use of the blockchain(s) and determine violations that may necessitate loss of stake by consortium member(s).

The access management module(s) 104 may control the access given to external entities, to control whether and how such entities may access data from (e.g., private) blockchain(s) 110. For example, a blockchain 110 may store information regarding the lifecycle of a particular auto insurance claim of an individual insurance policy holder. An external party, such as a body shop, may wish to update the private blockchain 110 to verify that a repair was complete and receive payment. The external party may also request to read data from the blockchain 110. Read and write requests from external parties, or from external (e.g., public or private) blockchains 114, may be processed by the access management module(s) 104.

Following the body shop example, an operator of the access management device(s) 102 may interact with the access management module(s) 104 and instruct the access management module(s) 104 to generate a key 118 to be provided to the body shop. Key generation is described further with reference to FIG. 4. The key 118 may be associated with metadata 106 that describes the access type 212 to be given to the body shop (e.g., read-only, or read/write access). The metadata 106 may describe time constraint(s) 206 such as a time duration of the key 118, e.g., a timestamp when the key 118 expires. The time constraint(s) 206 may indicate that the key 118 provides a single access to the private blockchain 110 (e.g., within a period of time) or multiple accesses to the blockchain 110. The metadata 106 may include target blockchain area ID(s) 204 indicating the particular portion(s) of the private blockchain 110 to be accessible to the body shop. For example, the body shop may be given permission to access blockchain data associated with the particular claim or repair being handled by the body shop, but not other data stored on the blockchain 110. In some implementations, the data on the private blockchain 110 may be in the form of multiple smart contracts. In such examples, the key 118 may enable access to certain smart contract(s) on the private blockchain 110 and prevent access to other smart contracts.

The key 118 may be provided to the body shop using one of various methods. For example, the key 118 may be given to the body shop over the phone, in an email, in a text message, or through other communications. In some examples, the key 118 is uploaded to a web site, file transfer protocol (FTP) site, or other network location. The body shop may access the network location and retrieve the key 118. The key 118 may be transferred securely to the body shop, e.g., to the external device(s) 112 of the body shop, using public key infrastructure (PKI) encryption or other forms of encryption. In some examples, the key 118 is associated with a particular accessor ID 208 of the body shop, such as an IP address, MAC address, or a unique address or identifier established between the access management module(s) 104 and the body shop. In such examples, the key 118 may only be used by a requesting entity with the accessor ID 208.

The body shop, e.g., a process executing on the external device 112 of the body shop, may provide the key 118 to the access management module(s) 104 in an access request 116. The access management module(s) 104 may verify that the access request 116 satisfies the restrictions in the metadata 106 governing use of the key 118. For example, the access management module(s) 104 may confirm that the access request 116 is for portion(s) of the private blockchain 110 corresponding to the target blockchain area ID(s) 204 for the key 118. The access management module(s) 104 may confirm that the key 118 is being used according to the prescribed time constraint(s) 206, and that the access request 116 is coming from an address associated with the accessor ID 208. In some examples, additional security may be used to secure the access request 116 from the external device 112 to the access management module(s) 104. For example, two-factor authentication may be used, or the access request 116 may be made over a connection that is secured using Hypertext Transfer Protocol Secure (HTTPS) or other security protocols.

In some examples, the key 118 is valid for a single access to the blockchain 110. Such a key 118 may be provided to an external entity that only rarely requires access to the private blockchain 110. In some examples, an application (e.g., an app) may be provided to entities that require more frequent access to internal blockchain(s) 110, such as body shops that frequently handle repairs for an insurance company that maintains the internal blockchain(s) 110. Such an application may execute on the external device 112 (e.g., as a client-side app) or on the access management device(s) 102 (e.g., as a web app), and may interact with the access management module(s) 104 to enable the external entity to access various blockchain(s) 110 that store data relevant to the external entity.

The third party permission information 210 may specify one or more other parties that are required to give permission for the external entity to access the private blockchain 110. For example, permission from the policy holder may be required before the body shop is provided access to blockchain data associated with the insurance policy. In such examples, the policy holder may receive a notification (e.g., a push notification) from the access management module(s) 104 when the body shop requests access, and the policy holder may instruct the access management module(s) 104 to allow or block the body shop's access. The access management module(s) 104 may determine that the permission of one or more additional parties is needed based on the third party permission information 210 included in the metadata 106 associated with the key 118. An operator of the access management module(s) 104, when requesting generation of the key 118 by the access management module(s) 104, may indicate that the policy holder's permission is required for the body shop to access the private blockchain 110. In some examples, the access management module(s) 104 may employ a set of rules to determine whether additional permission(s) are needed to access a particular blockchain 110. For example, the access management module(s) 104 may determine that the access request 116 is from a particular type of external entity (e.g., body shop) and apply rules that indicate policy holder permission is required for such an access request 116. The rules may enable the access management module(s) 104 to make decisions regarding access based on the parties involved, the type of data being requested, or other criteria. Access to data on a consortium blockchain 110 may require the permission of the various entities in the consortium.

Figure 3:
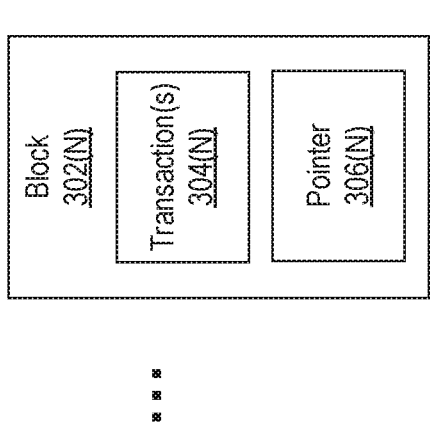
FIG. 3 depicts a schematic of an example blockchain, according to implementations of the present disclosure.
Figure 3:
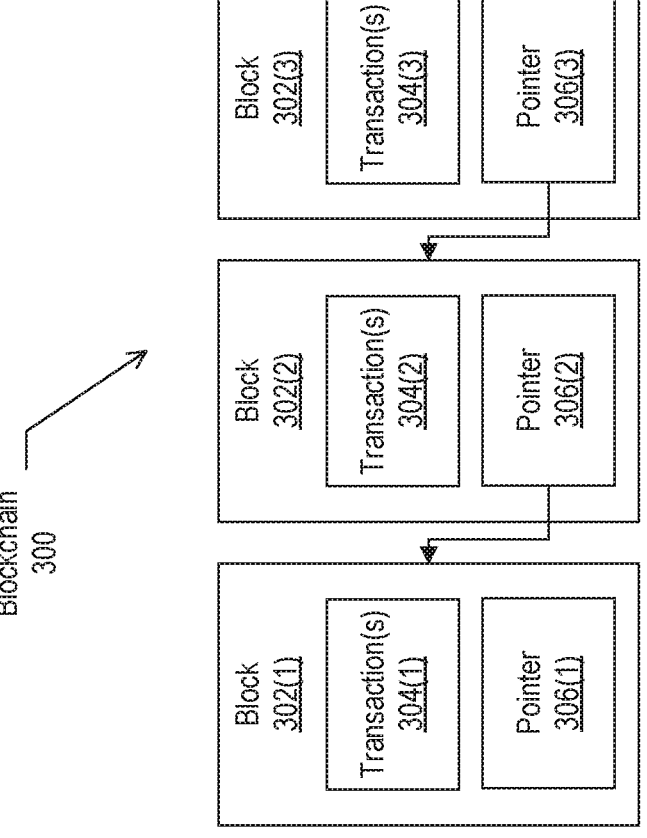

FIG. 3 depicts a schematic of an example blockchain 300, according to implementations of the present disclosure. The blockchain 300 may describe the blockchain 110, the external blockchain 114, or other blockchains. As shown in FIG. 3, a blockchain 300 may include any number of blocks 302, in this example numbered 1 through N where N is any number. A block 302 may include, or be associated with a list of transaction(s) 304. The transaction(s) 304 may include the data stored in the blockchain 300, and each block 302 may store any number of records each indicating when and in what order the transaction(s) 304 are applied to modify the data stored in the blockchain 300. Each block 302 may also include a pointer 306 that identifies a previous (e.g., or next) block 302 in the blockchain 300.

To provide further context for the present disclosure, a high-level discussion of blockchain technology is provided. In general, a blockchain is a public ledger of all transactions that have ever been executed in one or more contexts (e.g., negotiable instrument transactions, digital currency transactions, etc.). A blockchain constantly grows as completed blocks are added with a new set of transactions. In some examples, a single block is provided from multiple transactions (e.g., multiple deposits of different checks by different people). In general, blocks are added to the blockchain in a linear, chronological order by one or more computing devices in a peer-to-peer network of interconnected computing devices that execute a blockchain protocol. In short, the peer-to-peer network can be described as a plurality of interconnected nodes, each node being a computing device that uses a client to validate and relay transactions (e.g., deposits of checks). Each node maintains a copy of the blockchain, which is automatically downloaded to the node upon joining the peer-to-peer network. The blockchain protocol provides a secure and reliable method of updating the blockchain, copies of which are distributed across the peer-to-peer network, without use of a central authority.

Because all users (e.g., financial institutions) need to know all previous transactions (e.g., check deposits) to validate a requested transaction (e.g., check deposit), all users must agree on which transactions have actually occurred, and in which order. For example, if two users observe different transaction histories, they will be unable to come to the same conclusion regarding the validity of a transaction. The blockchain enables all users to come to an agreement as to transactions that have already occurred, and in which order. In short, and as described in further detail below, a ledger of transactions is agreed to based on the amount of work required to add a transaction to the ledger of transactions (e.g., add a block to the blockchain). In this context, the work is a task that is difficult for any single node (e.g., computing device) in the peer-to-peer network to quickly complete, but is relatively easy for a node (e.g., computing device) to verify.

The peer-to-peer network includes so-called miners (e.g., computing devices) that add blocks to a blockchain based on the blockchain protocol. In general, multiple miners validate transactions that are to be added to a block, and compete (e.g., perform work, as introduced above) to have their block added to the blockchain. Validation of transactions includes verifying digital signatures associated with respective transactions. For a block to be added to the blockchain, a miner must demonstrate a proof of work before their proposed block of transactions is accepted by the peer-to-peer network, and is added to the blockchain. A blockchain protocol includes a proof of work scheme that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In some examples, the hash value is a one-way hash value, in that the hash value cannot be 'un-hashed' to determine what the input was. The blockchain protocol can require multiple pieces of information as input to the CHF. For example, the input to the CHF can include a reference to the previous (most recent) block in the blockchain, details of the transaction(s) that are to be included in the to be created block, and a nonce value (e.g., a random number used only once).

As introduced above, multiple nodes compete to hash a set of transactions and provide the next block that is to be added to the blockchain. The blockchain protocol provides a threshold hash to qualify a block to be added to the blockchain. For example, the threshold hash can include a predefined number of zeros (0's) that the hash value must have at the beginning (e.g., at least the first four characters of the hash value must each be zero). The higher the number of zeros, the more time-consuming it is to arrive at a qualifying hash value.

In accordance with the blockchain protocol, each miner in the peer-to-peer network receives transaction information for one or more transactions that are to be included in a block that is to be added next in the blockchain. Each miner provides the reference to the previous (most recent) block in the blockchain, details of the transaction(s) that are to be included in the to-be-created block, and the nonce value to the CHF to provide a hash value. If the hash value does not meet the threshold hash (e.g., the first four characters of the hash value are not each zero), the miner starts again to provide another hash value. If the hash value meets the threshold hash (e.g., at least the first four characters of the hash value are each zero), the respective miner successfully created the next block that is to be added to the blockchain. Consequently, the respective miner's block is broadcast across the peer-to-peer network. All other miners cease work (because one miner was already successful), and all copies of the blockchain are updated across the peer-to-peer network to append the block to the blockchain. Each miner may be required to produce hundreds or thousands of hash values, before any one miner provides a qualifying hash value (e.g., at least the first four characters of the hash value are each zero).

In some cases, the distributed ledger system can include one or more sidechains. A sidechain can be described as a blockchain that validates data from other blockchains. In some examples, a sidechain enables ledger assets (e.g., a digital currency) to be transferred between multiple block-chains.

Figure 4:
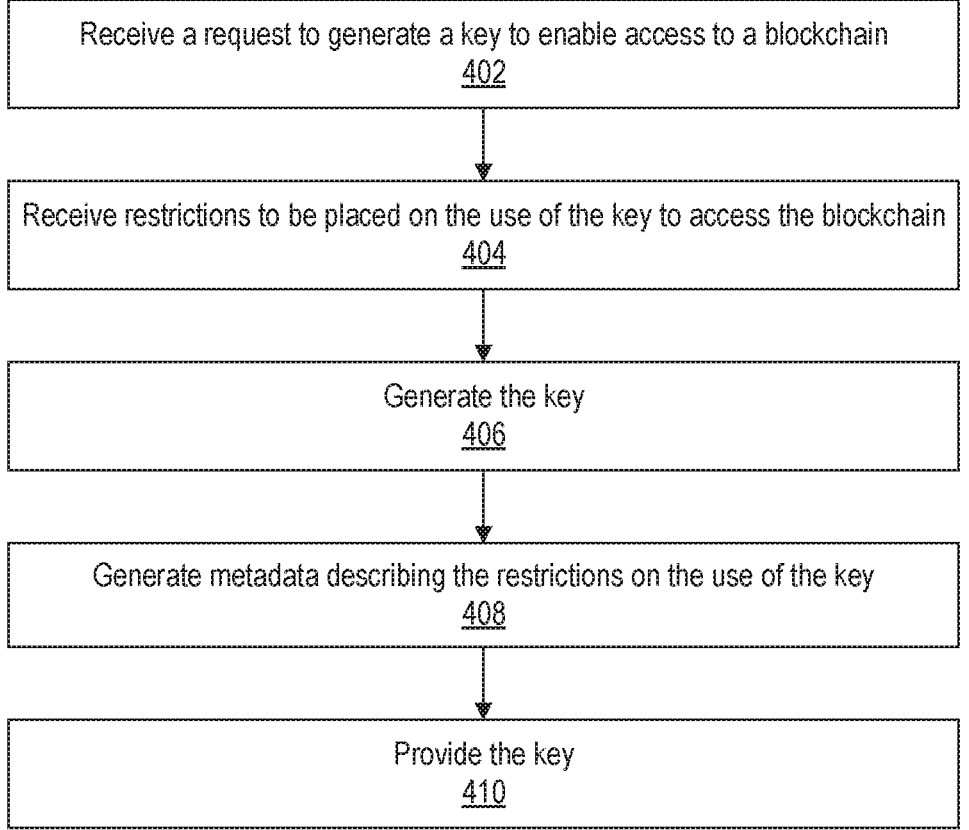
FIG. 4 depicts a flow diagram of an example process for generating a key to be used for blockchain access, according to implementations of the present disclosure.

FIG. 4 depicts a flow diagram of an example process for generating a key 118 to be used for blockchain access, according to implementations of the present disclosure. Operations of the process may be performed by one or more of the access management module(s) 104 or other software module(s) executing on the access management device(s) 102, the external device(s) 112, or other computing device(s).

A request may be received (402), e.g., by the access management module(s) 104, to generate a key 118 to be used for requesting access to a blockchain 110. In some examples, the key request may be submitted by an operator of the access management device(s) 102, through a user interface (UI) presented by the access management module(s) 104. Various restriction(s) may also be received (404). The restriction(s) may be specified to be placed on the use of the key 118 to access the blockchain 110. In some implementations, the restriction(s) are received as part of the request, e.g., through the UI presented by the access management module(s) 104. For example, an operator may specify the particular blockchain 110 to be accessible using the key 118, the portion(s) of the blockchain 110 to be accessible, the time constraints, the accessor ID, the access type, or other restrictions on the access.

The key 118 may be generated (406), and the metadata 106 may be generated (408) to describe the specified restrictions to be placed on use of the key 118. The key 118 may be provided to the operator that requested the key 118. The key 118 may then be communicated from the operator to the external party seeking access to the blockchain 110. In some examples, the key 118 may be sent automatically to the external party following generation of the key 118.

Figure 5:
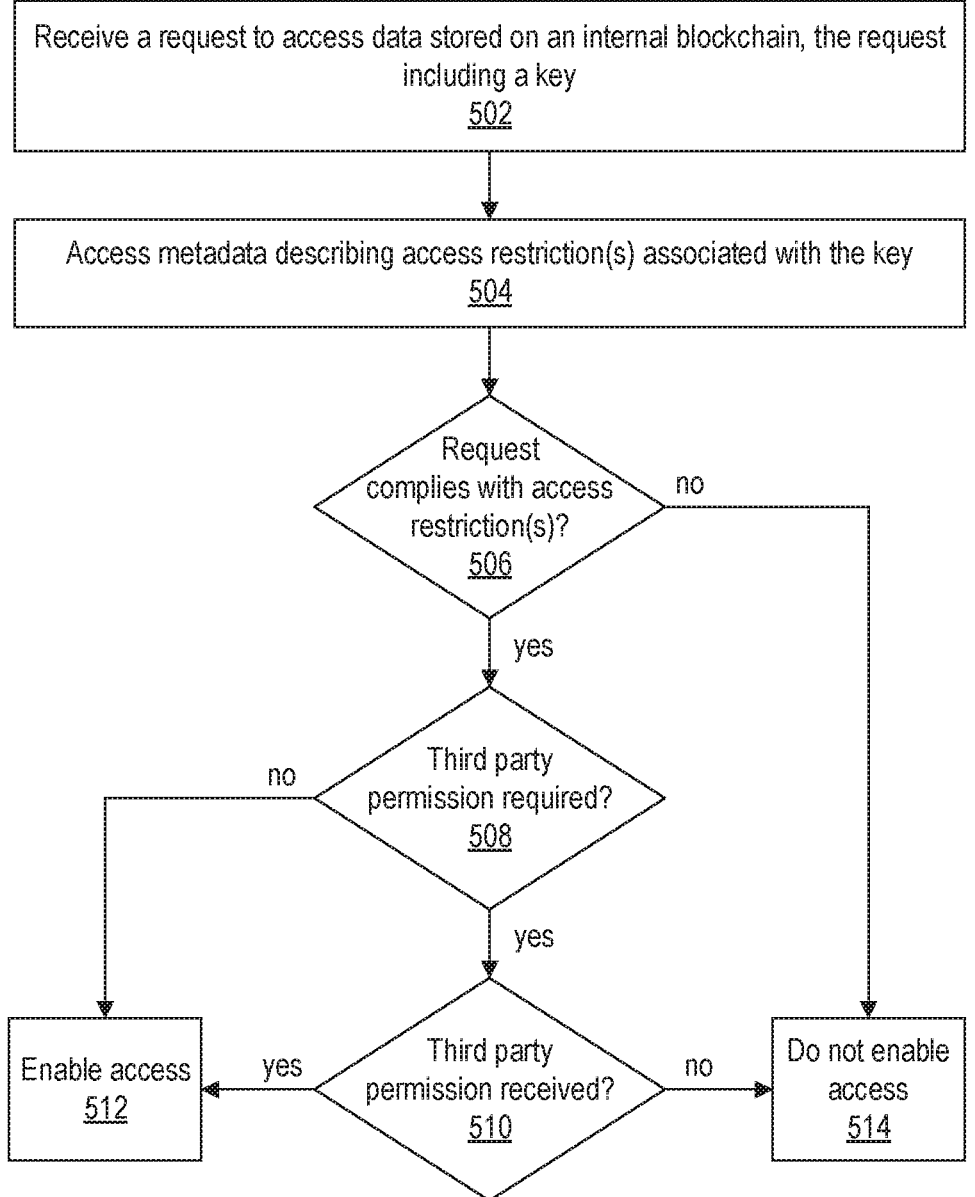
FIG. 5 depicts a flow diagram of an example process for managing access to data stored in a blockchain, according to implementations of the present disclosure.

FIG. 5 depicts a flow diagram of an example process for managing access to data stored in a blockchain 110, according to implementations of the present disclosure. Operations of the process may be performed by one or more of the access management module(s) 104 or other software module(s) executing on the access management device(s) 102, the external device(s) 112, or other computing device(s).

An access request 116 may be received (502), requesting access to data stored on an internal blockchain 110. The access request 116 may include the key 118 previously generated and provided to the external entity seeking access. In some examples, the key 118 may be communicated to the access management module(s) 104 separately from the access request 116.

The metadata 106 associated with the key 118 may be accessed (504). As described above, the metadata 106 may specify one or more restrictions on the use of the key 118. A determination may be made (506) whether the access request 116 complies with the restriction(s) specified in the metadata 106. If not, the process may not enable access (514) to the blockchain 110. If the access request 116 complies with the restriction(s), the process may proceed to 508.

A determination may be made (508), e.g., based on the third party permission information 210, whether the permission of one or more third parties is required to access the blockchain 110. If not, the process may enable access (512) to the blockchain 110. If third party permission is required, the process may proceed to 510 and may send notifications to the various third parties to request their permission. A determination may be made (510) whether the required third party permission(s) have been received. If the required permission(s) are received, the process may enable access (512) to the blockchain 110. If not, the process may not enable access (514).

The access management module(s) 104 may also control the communication of data from the (e.g., private) block-chain 110 to external entities. In some implementations, the access management module(s) 104 employ a set of rules 126 that govern the external communication of data. For example, particular internal users or processes within a business may be permitted to communicate data externally, and other users or processes may be blocked from doing so. In some examples, particular types of data may be communicated externally but not other types of data. For example, personally identifiable information (PII) of customers may be blocked from being externally communicated outside the corporate network. In one example, a publicly traded company that controls the private blockchain 110 may wish to communicate, to the public, quarterly earnings reports or other financial information. The access management module(s) 104 may permit such public dissemination of information, but block the public communication of other more sensitive data. In some examples, the communication of private blockchain data outside of an organization may require the permission of various entities associated with the blockchain data, such as the individual customer (e.g., policy holder) associated with the data or the entities involved in a consortium. In some examples, the access management module(s) 104 may block any communication of private blockchain data to external entities, or only allow such communication in specific circumstances or by particular operators.

Figure 6:
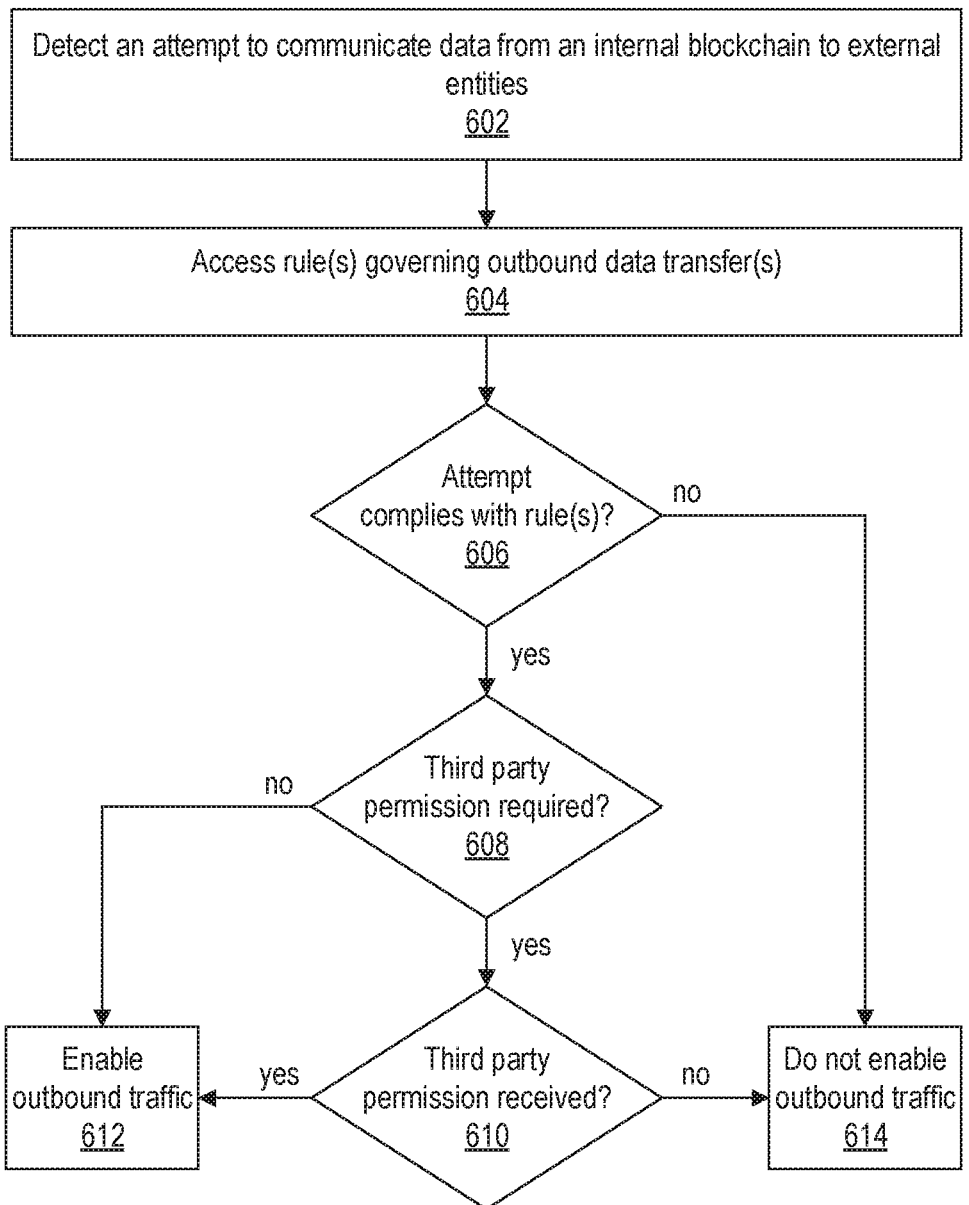
FIG. 6 depicts a flow diagram of an example process for managing the communication of data from an internal blockchain to an external entity, according to implementations of the present disclosure.

FIG. 6 depicts a flow diagram of an example process for managing the communication of data from an internal blockchain 110 to an external blockchain 114 or other external entity, according to implementations of the present disclosure. Operations of the process may be performed by one or more of the access management module(s) 104 or other software module(s) executing on the access management device(s) 102, the external device(s) 112, or other computing device(s).

An attempt may be detected (602) to communicate data from an internal blockchain 110 to one or more external entities. The rule(s) 126 governing outbound communicate of data from the blockchain 110 may be accessed (604). As described above, the rule(s) 126 may be associated with a particular blockchain 110, or with a class of blockchain(s) 110 (e.g., blockchains storing data regarding insurance policies). A determination may be made (606) whether the attempted communication complies with the rule(s) 126. If not, the process may not enable the outbound communication of the data from the blockchain 110. If the attempted communication complies with the rule(s) 126, the process may proceed to 608.

A determination may be made (608) whether the permission of one or more third parties is required to externally communicate data from the blockchain 110. If not, the process may enable the outbound communication (612). If third party permission is required, the process may proceed to 610 and may send notifications to the various third parties to request their permission. A determination may be made (610) whether the required third party permission(s) have been received. If the required permission(s) are received, the process may enable the outbound communication (612). If not, the process may not enable the outbound communication (614).

Figure 7:
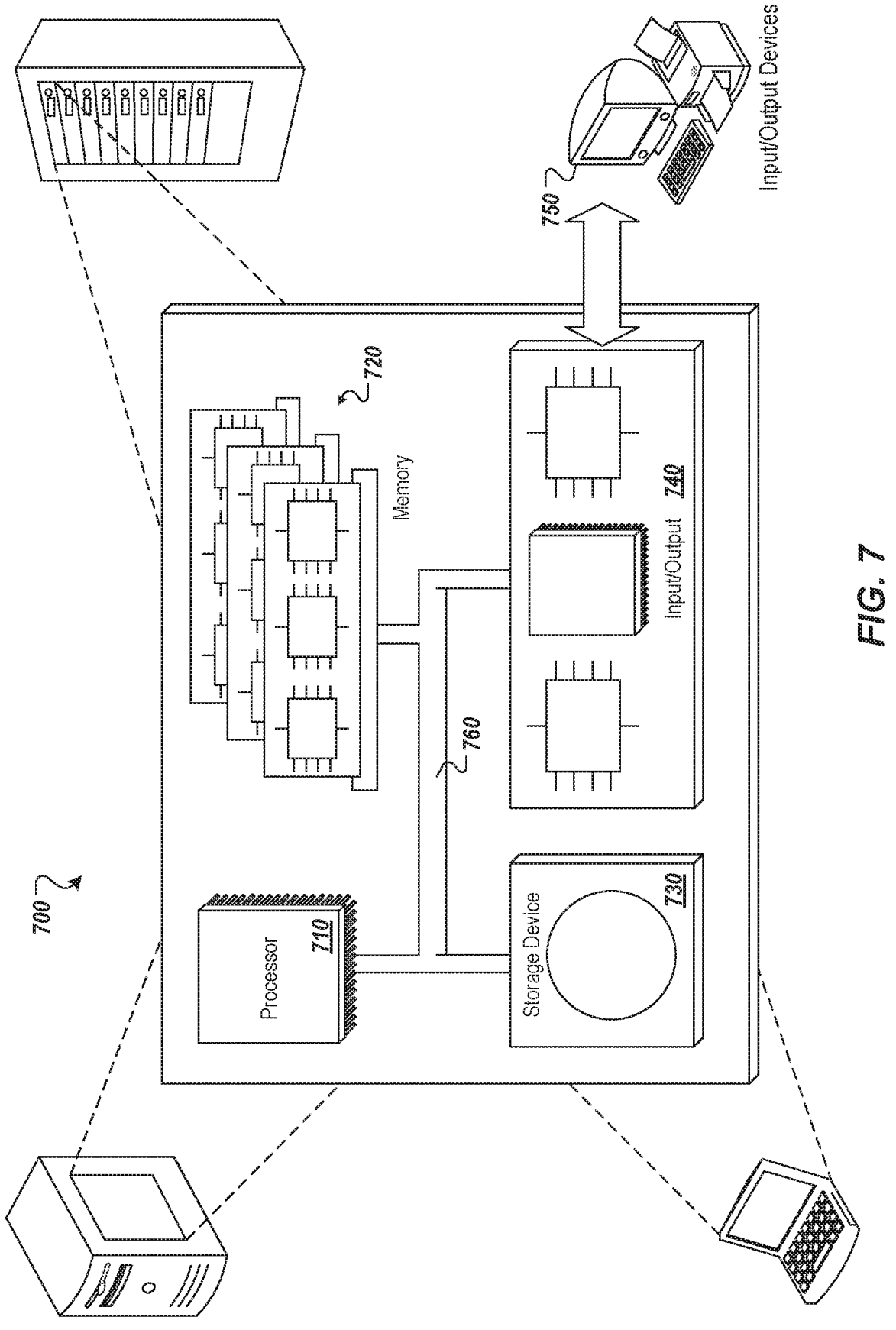
FIG. 7 depicts an example computing system, according to implementations of the present disclosure.

FIG. 7 depicts an example computing system, according to implementations of the present disclosure. The system 700 may be used for any of the operations described with respect to the various implementations discussed herein. For example, the system 700 may be included, at least in part, in one or more of the access management device(s) 102, external device(s) 112, or data storage 108 described herein. The system 700 may include one or more processors 710, a memory 720, one or more storage devices 730, and one or more input/output (I/O) devices 750 controllable via one or more I/O interfaces 740. The various components 710, 720, 730, 740, or 750 may be interconnected via at least one system bus 760, which may enable the transfer of data between the various modules and components of the system 700.

The processor(s) 710 may be configured to process instructions for execution within the system 700. The processor(s) 710 may include single-threaded processor(s), multi-threaded processor(s), or both. The processor(s) 710 may be configured to process instructions stored in the memory 720 or on the storage device(s) 730. The processor(s) 710 may include hardware-based processor(s) each including one or more cores. The processor(s) 710 may include general purpose processor(s), special purpose processor(s), or both.

The memory 720 may store information within the system 700. In some implementations, the memory 720 includes one or more computer-readable media. The memory 720 may include any number of volatile memory units, any number of non-volatile memory units, or both volatile and non-volatile memory units. The memory 720 may include read-only memory, random access memory, or both. In some examples, the memory 720 may be employed as active or physical memory by one or more executing software modules.

The storage device(s) 730 may be configured to provide (e.g., persistent) mass storage for the system 700. In some implementations, the storage device(s) 730 may include one or more computer-readable media. For example, the storage device(s) 730 may include a floppy disk device, a hard disk device, an optical disk device, or a tape device. The storage device(s) 730 may include read-only memory, random access memory, or both. The storage device(s) 730 may include one or more of an internal hard drive, an external hard drive, or a removable drive.

One or both of the memory 720 or the storage device(s) 730 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 700. In some implementations, the CRSM may include a data store that provides storage of computer-readable instructions or other information in a non-transitory format. The CRSM may be incorporated into the system 700 or may be external with respect to the system 700. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 710 and the memory 720 may be supplemented by, or incorporated into, one or more application-specific integrated circuits (ASICs).

The system 700 may include one or more I/O devices 750. The I/O device(s) 750 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 750 may also include one or more output devices such as a display, LED(s), an audio output device (e.g., a speaker), a printer, a haptic output device, and so forth. The I/O device(s) 750 may be physically incorporated in one or more computing devices of the system 700, or may be external with respect to one or more computing devices of the system 700.

The system 700 may include one or more I/O interfaces 740 to enable components or modules of the system 700 to control, interface with, or otherwise communicate with the I/O device(s) 750. The I/O interface(s) 740 may enable information to be transferred in or out of the system 700, or between components of the system 700, through serial communication, parallel communication, or other types of communication. For example, the I/O interface(s) 740 may comply with a version of the RS-232 standard for serial ports, or with a version of the IEEE 1284 standard for parallel ports. As another example, the I/O interface(s) 740 may be configured to provide a connection over Universal Serial Bus (USB) or Ethernet. In some examples, the I/O interface(s) 740 may be configured to provide a serial connection that is compliant with a version of the IEEE 1394 standard.

The I/O interface(s) 740 may also include one or more network interfaces that enable communications between computing devices in the system 700, or between the system 700 and other network-connected computing systems. The network interface(s) may include one or more network interface controllers (NICs) or other types of transceiver devices configured to send and receive communications over one or more networks using any network protocol.

Computing devices of the system 700 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 700 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A method comprising:

generating, by a processor of an access management device, a key for accessing data stored on a first distributed ledger accessible to the access management device, wherein the key comprises one or more restrictions governing accessing the data by the access management device, wherein the one or more restrictions comprise an access type, a time constraint, a number of accesses, an indication of a portion of the first distributed ledger, an accessor identification (ID), or a combination thereof, wherein:

the access type comprises a read-only access type or a read/write access type;

the time constraint comprises a key expiration time, a number of accesses within a period of time, or both;

the indication of the portion of the first distributed ledger comprises blockchain area identifications (IDs); and the accessor identification (ID) comprises an Internet Protocol (IP) address, a media access control (MAC) address, an established address, or a combination thereof associated with a second distributed ledger;

transmitting, by the processor, the key to an external device coupled to the access management device, wherein the external device is configured to store the key into the second distributed ledger accessible to the external device;

receiving, by the processor, a request to update the data stored on the first distributed ledger from the second distributed ledger of the external device based on additional data, wherein the request comprises the key and the additional data;

determining, by the processor, that the request complies with the one or more restrictions; and updating, by the processor, the data stored on the first distributed ledger based on the additional data in response to the request complying with the one or more restrictions, wherein access to the data is limited to the processor of the access management device and exclusive of the external device.

2. The method of claim 1, wherein the data comprises a plurality of smart contracts, wherein the key is associated with accessing a target smart contract of the plurality of smart contracts.

3. The method of claim 1, comprising receiving a request to generate the key from the external device.

4. The method of claim 1, comprising encrypting the key before transmitting the key to the external device.

5. The method of claim 1, wherein transmitting the key to the external device comprises transmission via email, transmission via text message, uploading to a web site, uploading to a file transfer protocol (FTP) site, or a combination thereof.

6. The method of claim 1, wherein the first distributed ledger corresponds to a private distributed ledger and the second distributed ledger corresponds to a public distributed ledger.

7. One or more non-transitory computer-readable storage media comprising instructions which, when executed by at least one processor of an access management device, cause the at least one processor to perform operations comprising:

generating a key for accessing data stored on a first distributed ledger accessible to the access management device, wherein the key comprises one or more restrictions governing accessing the data by the access management device, wherein the restrictions comprise an access type, a time constraint, a number of accesses, an indication of a portion of the first distributed ledger, an accessor identification (ID), or a combination thereof, wherein:

the access type comprises a read-only access type or a read/write access type;

the time constraint comprises a key expiration time, a number of accesses within a period of time, or both;

the indication of the portion of the first distributed ledger comprises blockchain area identifications (IDs); and the accessor identification (ID) comprises an Internet Protocol (IP) address, a media access control (MAC) address, an established address, or a combination thereof associated with a second distributed ledger;

transmitting the key to an external device coupled to the access management device, wherein the external device is configured to store the key into the second distributed ledger accessible to the external device;

receiving a request from the second distributed ledger to update the data stored on the first distributed ledger from the second distributed ledger of the external device based on additional data, wherein the request comprises the key and the additional data;

determining whether the request complies with the one or more restrictions;

updating the data stored on the first distributed ledger based on the additional data in response to the request complying with the one or more restrictions, wherein access to the data is limited to the processor of the access management device and exclusive of the external device; and blocking access to the data stored on the first distributed ledger in response to the request not complying with the one or more restrictions.

8. The one or more non-transitory computer-readable storage media of claim 7, wherein the instructions, when executed by at least one processor of an access management device, cause the at least one processor to receive a request to generate the key before generating the key.

9. The one or more non-transitory computer-readable storage media of claim 7, wherein the instructions, when executed by at least one processor of an access management device, cause the at least one processor to encrypt the key before transmitting the key to the external device.

10. The one or more non-transitory computer-readable storage media of claim 7, wherein transmitting the key to the external device comprises transmission via email, transmission via text message, uploading to a web site, uploading to a file transfer protocol (FTP) site, or a combination thereof.

11. A system, comprising:

at least one processor of an access management device; and a memory communicatively coupled to the at least one processor, the memory storing instructions which, when executed, cause the at least one processor to perform operations comprising:

generating a key for accessing data on a first distributed ledger accessible to the access management device, wherein the key comprises one or more restrictions governing accessing the data by the access management device, wherein the one or more restrictions comprise an access type, a time constraint, a number of accesses, an indication of a portion of the first distributed ledger, an accessor identification (ID), or a combination thereof, wherein:

the access type comprises a read-only access type or a read/write access type;

the time constraint comprises a key expiration time, a number of accesses within a period of time, or both;

the indication of the portion of the first distributed ledger comprises blockchain area identifications (IDs); and the accessor identification (ID) comprises an Internet Protocol (IP) address, a media access control (MAC) address, an established address, or a combination thereof associated with a second distributed ledger;

transmitting the key to an external device coupled to the access management device, wherein the external device is configured to store the key into the second distributed ledger accessible to the external device;

receiving a request to update the data stored on the first distributed ledger from the second distributed ledger of the external device based on additional data, wherein the request comprises the key and the additional data;

determining whether the request complies with the one or more restrictions;

updating the data stored on the first distributed ledger based on the additional data in response to the request complying with the one or more restrictions, wherein access to the data is limited to the processor of the access management device and exclusive of the external device; and blocking access to the data stored on the first distributed ledger in response to the request not complying with the one or more restrictions.

12. The system of claim 11, wherein the instructions, when executed cause the at least one processor to receive a request to generate the key before generating the key.

13. The system of claim 11, wherein the instructions, when executed cause the at least one processor to encrypt the key before transmitting the key to the external device.

14. The system of claim 11, wherein transmitting the key to the external device comprises transmission via email, transmission via text message, uploading to a web site, uploading to a file transfer protocol (FTP) site, or a combination thereof.

* * * * *